United States Patent
Rahman et al.

(10) Patent No.: US 11,228,464 B2
(45) Date of Patent: Jan. 18, 2022

(54) SRS HOPPING PATTERN BASED ON UE BANDWIDTH CONFIGURATION

(71) Applicant: Telefonaktiebolaget LM Ericsson (publ), Stockholm (SE)

(72) Inventors: Imadur Rahman, Sollentuna (SE); Christian Bergljung, Lund (SE); Stephen Grant, Pleasanton, CA (US); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/638,011

(22) PCT Filed: Aug. 10, 2018

(86) PCT No.: PCT/EP2018/071835
§ 371 (c)(1),
(2) Date: Feb. 10, 2020

(87) PCT Pub. No.: WO2019/030413
PCT Pub. Date: Feb. 14, 2019

(65) Prior Publication Data
US 2020/0244489 A1 Jul. 30, 2020

Related U.S. Application Data

(60) Provisional application No. 62/544,244, filed on Aug. 11, 2017.

(51) Int. Cl.
*H04L 25/02* (2006.01)
*H04L 5/00* (2006.01)

(52) U.S. Cl.
CPC ........ *H04L 25/0226* (2013.01); *H04L 5/0012* (2013.01); *H04L 5/0041* (2013.01); *H04L 5/0051* (2013.01); *H04L 5/0092* (2013.01)

(58) Field of Classification Search
CPC . H04L 25/0226; H04L 5/0012; H04L 5/0041; H04L 5/0051; H04L 5/0092; H04L 5/0048; H04B 1/7143
See application file for complete search history.

(56) References Cited

U.S. PATENT DOCUMENTS

| 2012/0257584 A1* | 10/2012 | Behravan | H04W 72/1289 |
| | | | 370/329 |
| 2013/0078913 A1* | 3/2013 | Lee | H04W 52/146 |
| | | | 455/39 |

(Continued)

FOREIGN PATENT DOCUMENTS

| EP | 2154811 A2 | 2/2010 |
| EP | 2437402 A1 | 4/2012 |
| WO | 2016107286 A1 | 7/2016 |

OTHER PUBLICATIONS

Eiricsson, "SRS hopping related aspects for NR UE", 3GPP TSG-RAN WG4 Meeting #84, Berlin, Germany, Aug. 21, 2017, pp. 1-5, R4-1708149, 3GPP.

(Continued)

*Primary Examiner* — Shukri Taha
(74) *Attorney, Agent, or Firm* — Coats & Bennett, PLLC

(57) ABSTRACT

Suitable hopping patterns designed to alleviate degradations of SRSs are provided herein. When a UE (12, 14, 200) transmits multiple SRS within the same time resource (e.g., slot), the UE is configured with an SRS hopping pattern (including an SRS bandwidth) based on at least a UE configuration bandwidth. In one exemplary embodiment, a node (12, 14, 200), e.g., a UE (14, 200) or a network node (12, 200) of a wireless network (10), controls the SRS configurations for SRS transmissions by the UE (14, 200) via one or more resource blocks. The SRS configuration comprises a hopping pattern and a first (e.g., hopping) bandwidth associated with the SRS transmissions. The node (Continued)

(12, 14, 200) determines the first bandwidth, and determines a second (e.g., configuration) bandwidth associated with a configuration of the UE (14, 200). The node (12, 14, 200) determines the SRS configuration for the UE (14, 200) responsive to the first and second bandwidths, and configures the UE (14, 200) according to the determined SRS configuration to control SRS transmissions by the UE (14, 200).

20 Claims, 11 Drawing Sheets

(56) References Cited

U.S. PATENT DOCUMENTS

| | | | |
|---|---|---|---|
| 2017/0033908 A1* | 2/2017 | Hwang | H04L 5/0053 |
| 2017/0048717 A1* | 2/2017 | Yoo | H04L 5/1469 |
| 2017/0141900 A1* | 5/2017 | McCoy | H04L 5/0048 |
| 2018/0083752 A1* | 3/2018 | Kim | H04W 72/0453 |

OTHER PUBLICATIONS

3rd Generation Partnership Project, "3rd Generation Partnership Project; Technical Specification Group Radio Access Network; Evolved Universal Terrestrial Radio Access (E-UTRA); User Equipment (UE) radio tansmission and reception (Release 14)", Technical Specification, 3GPP TS 36.101 V14.1.0, Sep. 1, 2016, pp. 1-1187, 3GPP, France.

* cited by examiner

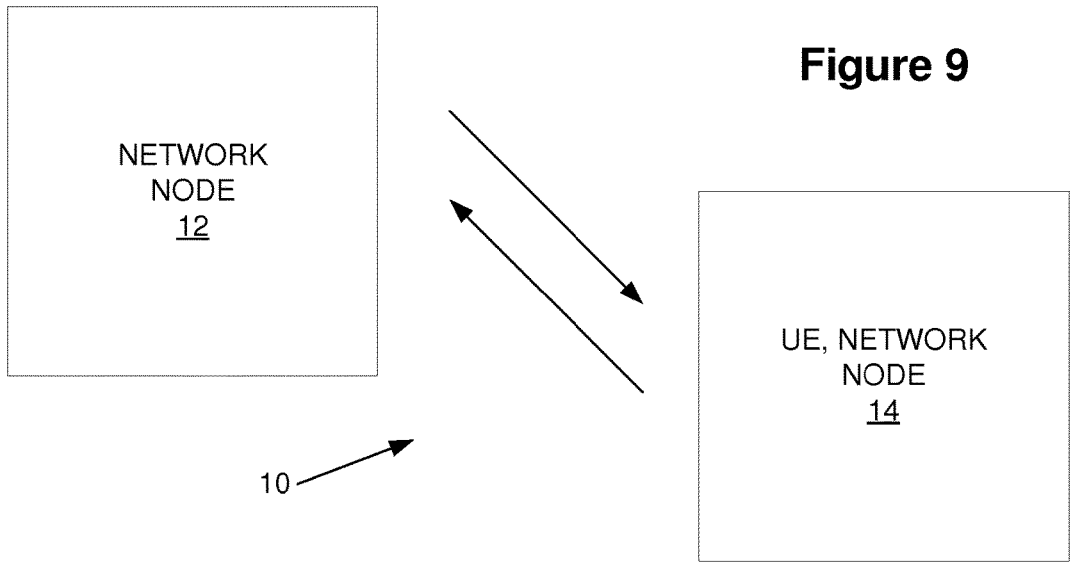
Figure 9
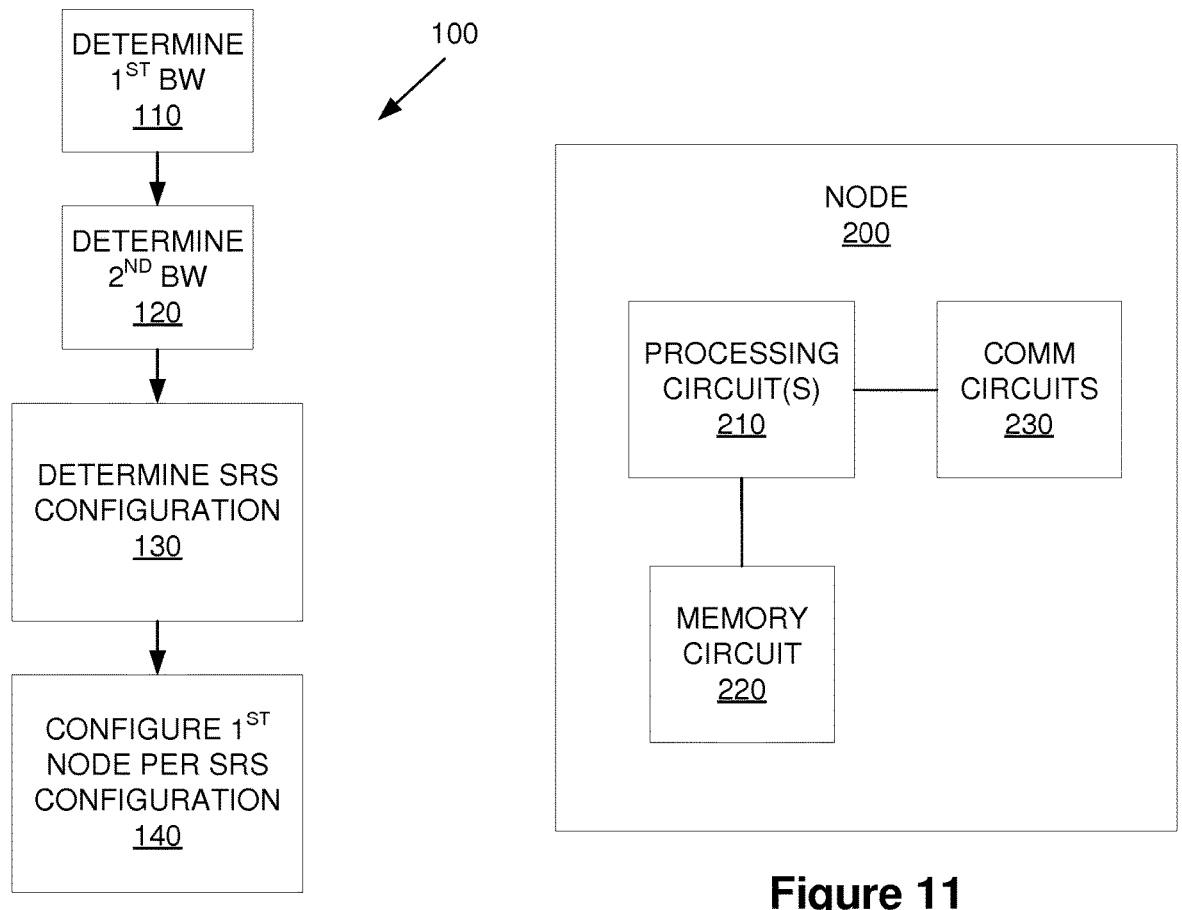
Figure 10
Figure 11

SRS HOPPING PATTERN BASED ON UE BANDWIDTH CONFIGURATION

This application claims priority to Provisional U.S. Patent Application No. 62/544,244 filed 11 Aug. 2017, the disclosure of which is incorporated herein by reference in its entirety.

TECHNICAL FIELD

The application generally relates to wireless communications, and more particularly to controlling a configuration of SRS transmissions used to estimate wireless channel properties.

BACKGROUND

NR (a.k.a. 5G or Next Generation) architecture is being discussed in 3GPP. In NR, which is based on OFDM (Orthogonal Frequency Division Multiplexing), multiple numerologies are supported for operation, e.g., the transmission and/or reception of signals. The term numerology may characterize any one or more of frame duration, subframe or TTI duration, slot duration, min-slot duration, symbol durations subcarrier spacing, number of subcarriers per physical channel (e.g., Radio Bearer (RB)), number of RBs within the bandwidth.

A scaling approach (based on a scaling factor $2^N$, N=1, 2, ...) is considered for deriving subcarrier spacings for NR: 15 kHz, 30 kHz, 60 kHz, 120 KHz etc. The numerology-specific time resource durations (e.g., slot, subframe etc.) can then be determined in milliseconds (ms) based on the subcarrier spacing: subcarrier spacing of $(2^N*15)$ kHz gives exactly $\frac{1}{2^N}$ ms. Table 1 illustrates examples of numerology for NR in terms of carrier spacing, slot duration, symbol duration, CP (Cyclic Prefix) length, etc.

TABLE 1

Example Subcarrier Spacing Candidate Configurations for NR

| | Subcarrier spacing | | | | |
|---|---|---|---|---|---|
| | 15 kHz | 30 kHz (2 × 15 kHz) | 60 kHz (4 × 15 kHz) | 120 kHz (8 × 15 kHz) | 240 kHz (16 × 15 kHz) |
| Example slot duration | 500 μs | 250 μs | 125 μs | 77.5 μs | 38.75 μs |
| OFDM symbol, duration | 66.67 μs | 33.33 μs | 16.67 μs | 8.335 μs | 4.1675 μs |
| Cyclic prefix, duration | 4.76 μs | 2.38 μs | 1.19 μs | 0.595 μs | 0.2975 μs |
| OFDM symbol including cyclic prefix | 71.43 μs | 35.71 μs | 17.86 μs | 8.93 μs | 4.465 μs |

Sounding reference signals (SRS) are known signals transmitted by UEs so that the network node, e.g., eNodeB, can estimate different uplink-channel properties. These estimates may be used for uplink scheduling and link adaptation but also for downlink multiple antenna transmission, especially in case of TDD (Time Division Duplex), where the uplink and downlink use the same frequencies. The SRS signals have time duration of a single OFDM symbol in LTE. In NR, two or four consecutive OFDM symbols can also be used for SRS transmission.

For LTE, SRSs can be transmitted in the last symbol of a 1 ms uplink subframe, and for the case with TDD, the SRS can also be transmitted in the special slot UpPTS (Uplink Pilot Time Slot). The length of UpPTS can be configured to be one or two symbols.

In NR, multiple SRS transmissions are allowed from UE within one resource block (e.g., time slot). For an X-port SRS resource spanning N adjacent OFDM symbols within the same slot, all X ports may be sounded in each of the N symbols but in a different portion of the band for each symbol.

In NR, one, two consecutive, or four consecutive OFDM symbols are used for SRS transmissions. Depending on UE capabilities, there may be a need for retuning of the UE transmitter which may cause interruptions in transmissions. Thus, there remains a need for improvements regarding SRS transmissions.

SUMMARY

The solution presented herein provides solutions (e.g., suitable hopping patterns) which can alleviate or avoid degradation of SRSs due to the possible retuning of the UE PA. Generally, when a UE transmits multiple Sounding Reference Signals (SRSs) within the same time resource (e.g. slot), the UE is configured with an SRS hopping pattern (including an SRS hopping bandwidth) based on at least the UE bandwidth, or alternatively the UE bandwidth is configured (or adapted) based on a selected SRS hopping pattern (including an SRS hopping bandwidth). The solution presented herein comprises methods implemented by a node in the wireless network, where the node may comprise either the UE or a network node in the wireless network.

One exemplary embodiment comprises a method of controlling an SRS configuration for SRS transmissions via one or more resource blocks by a first node in a wireless network. The SRS configuration comprises a hopping pattern and a first bandwidth associated with the SRS transmissions. The method comprises determining the first bandwidth associated with the SRS transmissions, and determining a second bandwidth associated with a configuration of the first node. The method further comprises determining the SRS configuration for the first node responsive to the first and second bandwidths, and configuring the first node according to the determined SRS configuration to control SRS transmissions by the first node.

One exemplary embodiment comprises a node in a wireless network configured to control an SRS configuration for SRS transmissions via one or more resource blocks by a first node in the wireless network. The SRS configuration comprises a hopping pattern and a first bandwidth associated with the SRS transmissions. The node comprises one or more processing circuits configured to determine the first bandwidth associated with the SRS transmissions, and determine a second bandwidth associated with a configuration of the first node. The one or more processing circuits are further configured to determine the SRS configuration for the first node responsive to the first and second bandwidths, and configure the first node according to the determined SRS configuration to control SRS transmissions by the first node. In some exemplary embodiments, the node comprises a second node remotely located from the first node. For example, in some exemplary embodiments the first node comprises a UE and the second node comprises a network node. In other exemplary embodiments, the node comprises the first node.

One exemplary embodiment comprises a node in a wireless network configured to control an SRS configuration for SRS transmissions via one or more resource blocks by a first node in the wireless network. The SRS configuration comprises a hopping pattern and a first bandwidth associated with the SRS transmissions. The node comprises an SRS bandwidth determination module, a configuration bandwidth determination module, an SRS configuration determination module, and an SRS configuration module. The SRS bandwidth determination module is configured to determine the first bandwidth associated with the SRS transmissions. The configuration bandwidth determination module is configured to determine a second bandwidth associated with a configuration of the first node. The SRS configuration determination module is configured to determine the SRS configuration for the first node responsive to the first and second bandwidths. The SRS configuration module is configured to configure the first node according to the determined SRS configuration to control SRS transmissions by the first node.

One exemplary embodiment comprises a computer program product for controlling an SRS configuration for SRS transmissions via one or more resource blocks by a first node in the wireless network. The SRS configuration comprises a hopping pattern and a first bandwidth associated with the SRS transmissions. The computer program product comprises software instructions which, when run on at least one processing circuit in a node in the wireless network, causes the node to determine the first bandwidth associated with the SRS transmissions, and determine a second bandwidth associated with a configuration of the first node. The software instructions which, when run on at least one processing circuit in a node in the wireless network, further cause the node to determine the SRS configuration for the first node responsive to the first and second bandwidths, and configure the first node according to the determined SRS configuration to control SRS transmissions by the first node.

BRIEF DESCRIPTION OF THE DRAWINGS

FIG. 9 shows an exemplary wireless network.
FIG. 10 shows a method according to one exemplary embodiment.
FIG. 11 shows a node according to one exemplary embodiment.

DETAILED DESCRIPTION

Figure 1:
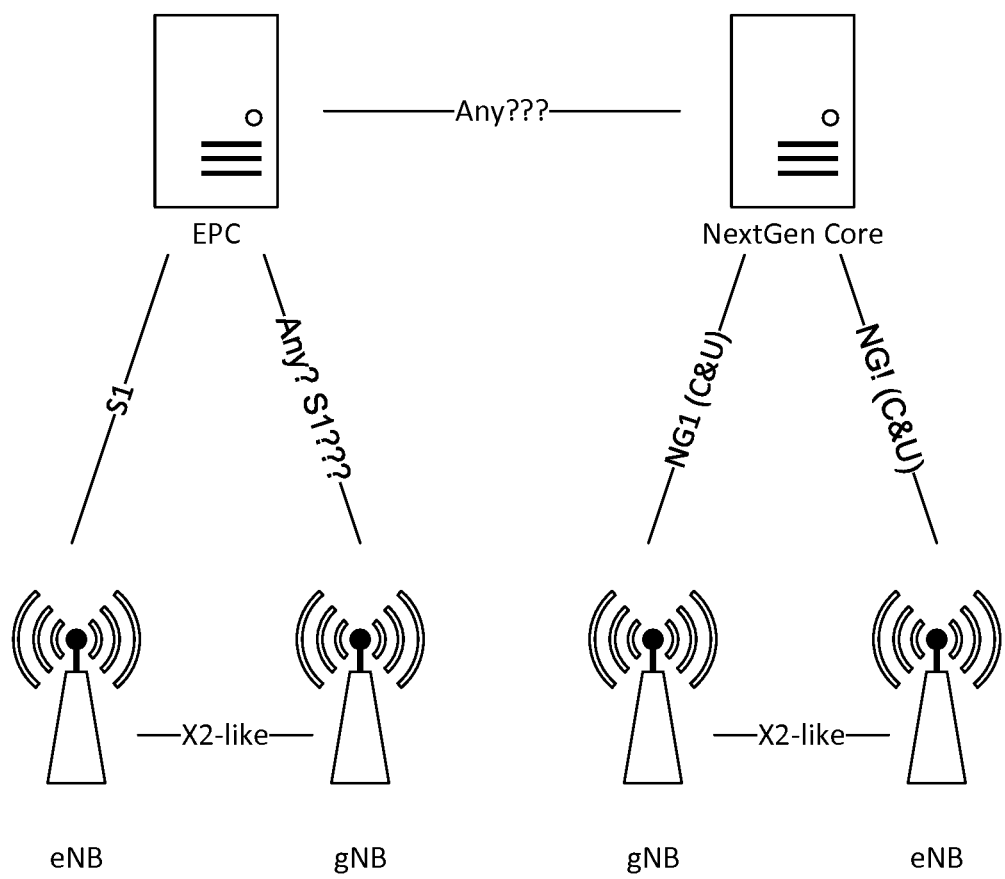
FIG. 1 shows one exemplary concept diagram for NR.
Figure 2:
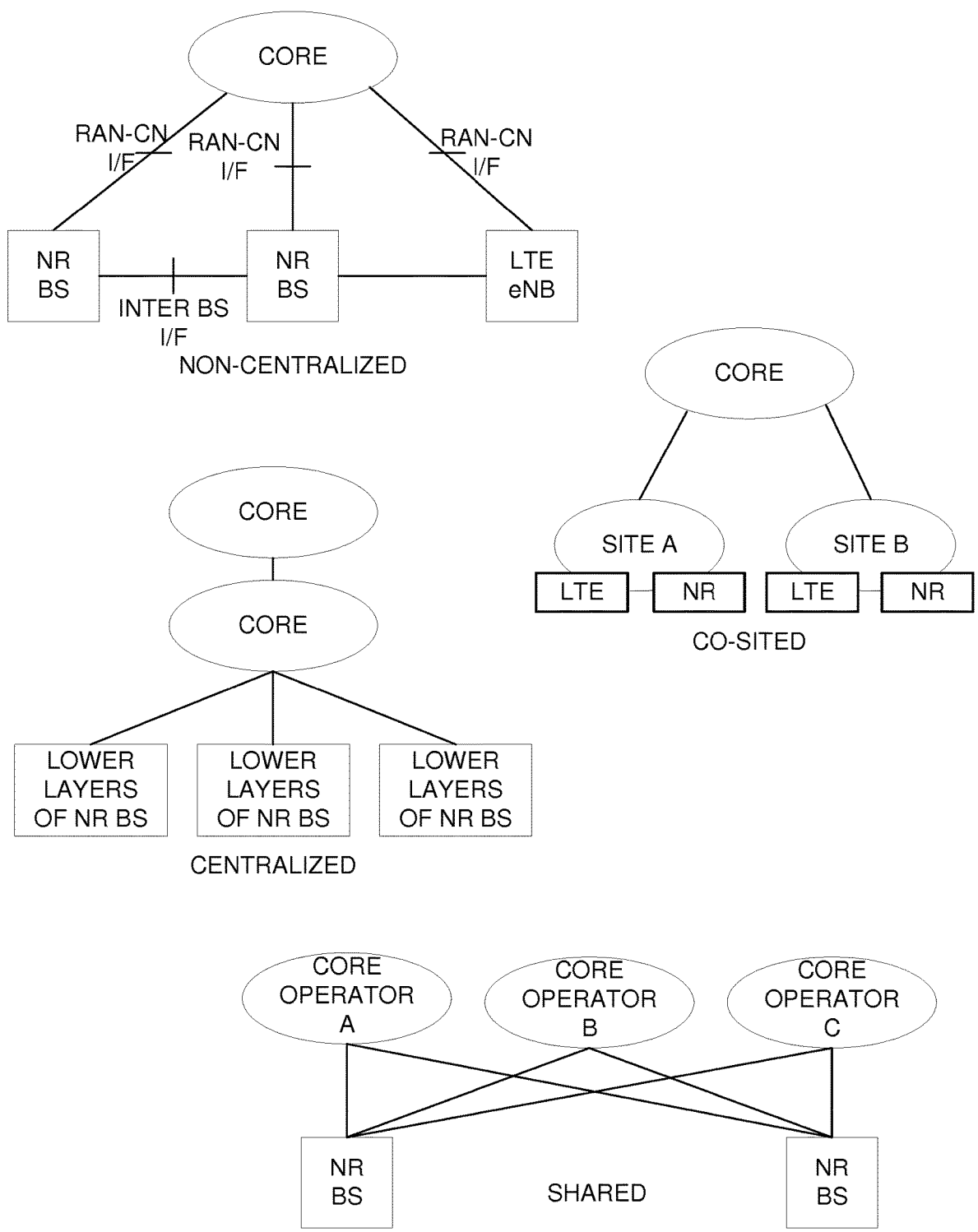
FIG. 2 shows exemplary deployment scenarios with NR BS.
Figure 3:
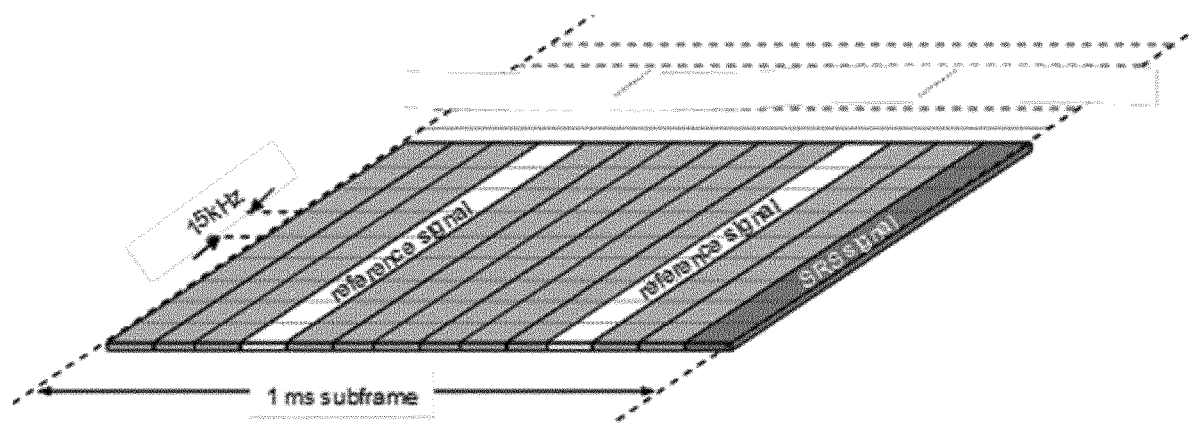
FIG. 3 shows an exemplary UL transmission subframe.
Figure 4:
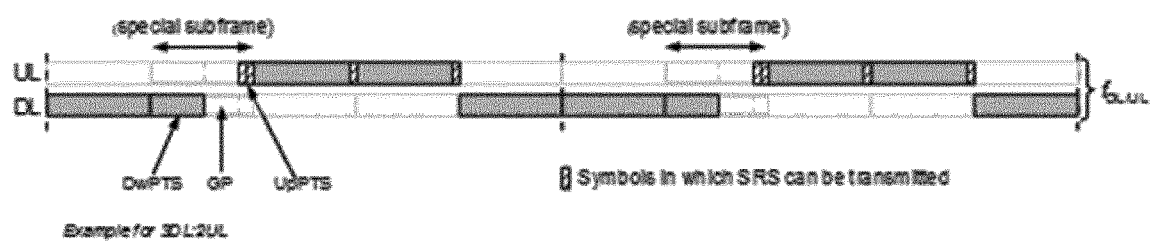
FIG. 4 shows exemplary TDD transmissions.

FIG. 1 shows a current concept for New Radio (NR), where "eNB" denotes LTE eNodeB and "gNB" denotes NR Base Station (BS), where one NR BS may correspond to one or more transmission/reception points, and where the lines between the nodes show the corresponding interfaces which are under discussion in 3GPP. FIG. 2 shows deployment scenarios with NR BS, which are discussed in 3GPP. As previously mentioned, the SRS signals have time durations of a single OFDM symbol in LTE. FIG. 3 shows an example of an uplink transmission subframe, with SRS signals, for LTE. In NR, two or four consecutive OFDM symbols can be used for SRS transmissions. FIG. 4 gives an example for TDD with 3DL:2UL within a 10 ms radio frame, where up to eight symbols may be set aside for SRS signals.

Figure 5A:
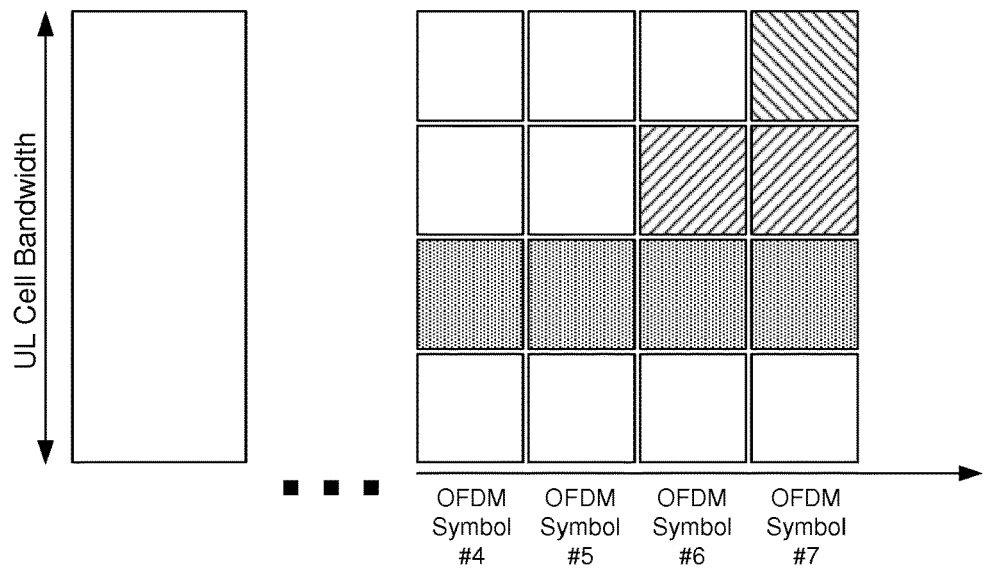
FIGS. 5a-5c show exemplary SRS hopping patterns.
Figure 5B:
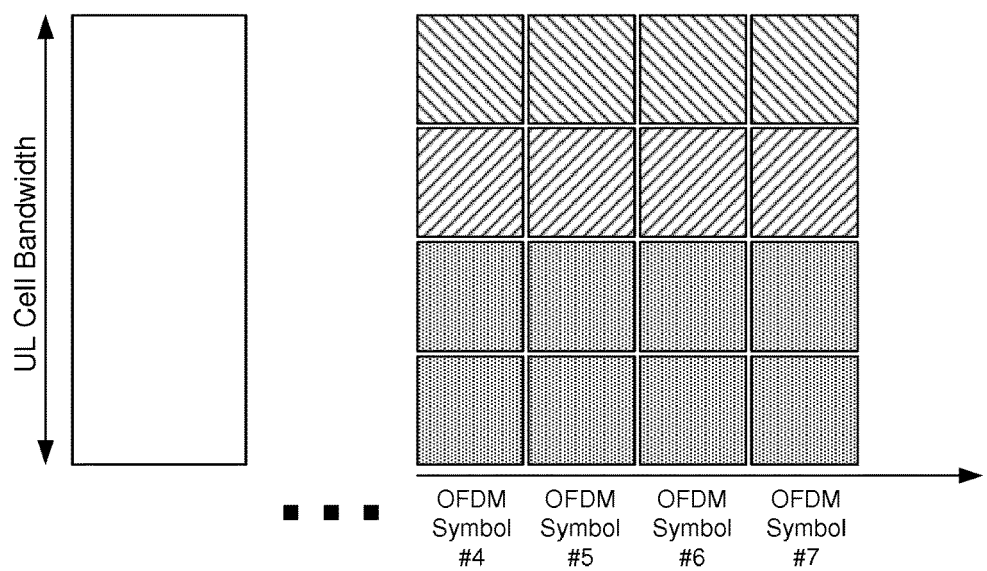
Figure 5C:
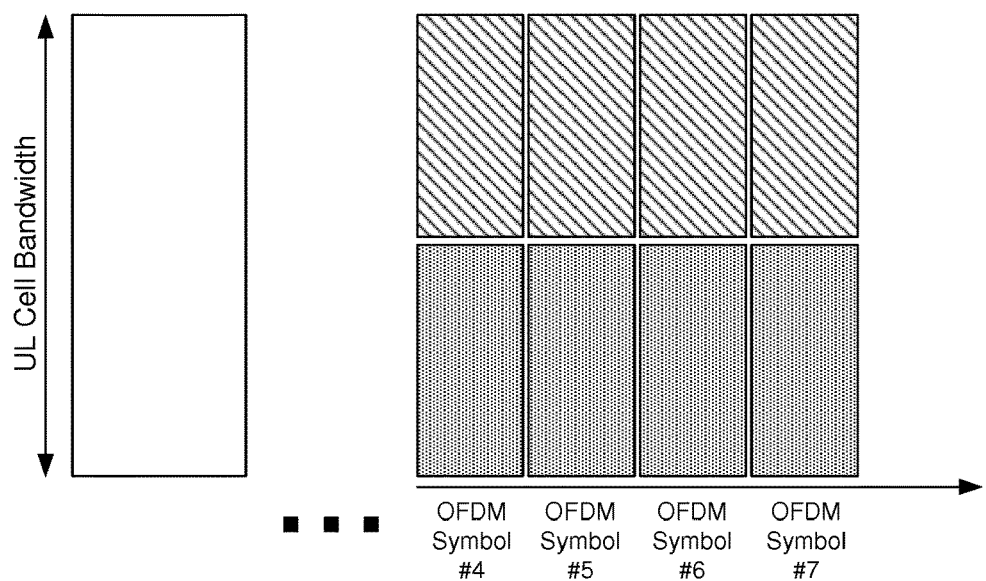

The SRS can be transmitted in one symbol, two consecutive symbols, or four consecutive symbols from any port with regard to UE. The locations of OFDM symbols can be anywhere within the slot. FIGS. 5a-5c show exemplary hopping patterns. FIG. 5a shows an example of partial bandwidth SRS transmission. It will be appreciated, however, that full bandwidth SRS transmission is also allowed. Also, while FIGS. 5a-5c show the SRS transmission at the end of the slot, it is still under discussions whether other OFDM symbols can be used for SRS transmissions. The embodiments discussed herein are applicable for any number of OFDM symbols for SRS transmissions anywhere within a time resource (e.g., slot).

FIGS. 5b-5c show examples of the SRS design in general for NR. All X ports are sounded in each OFDM symbol. If hopping is not configured, then the same bandwidth would be sounded for all ports in all four symbols. If hopping is configured, then different portions of the band would be sounded, but in each symbol, all ports would still be sounded in each hopping subband, as shown in FIG. 6.

In NR, the possibility of enabling SRS hopping across different OFDM symbols within a slot is also being discussed. As mentioned earlier, for an X-port SRS resource spanning N adjacent OFDM symbols within the same slot, all X ports may be sounded in each of the N symbols but in a different portion of the band for each symbol.

Figure 6:
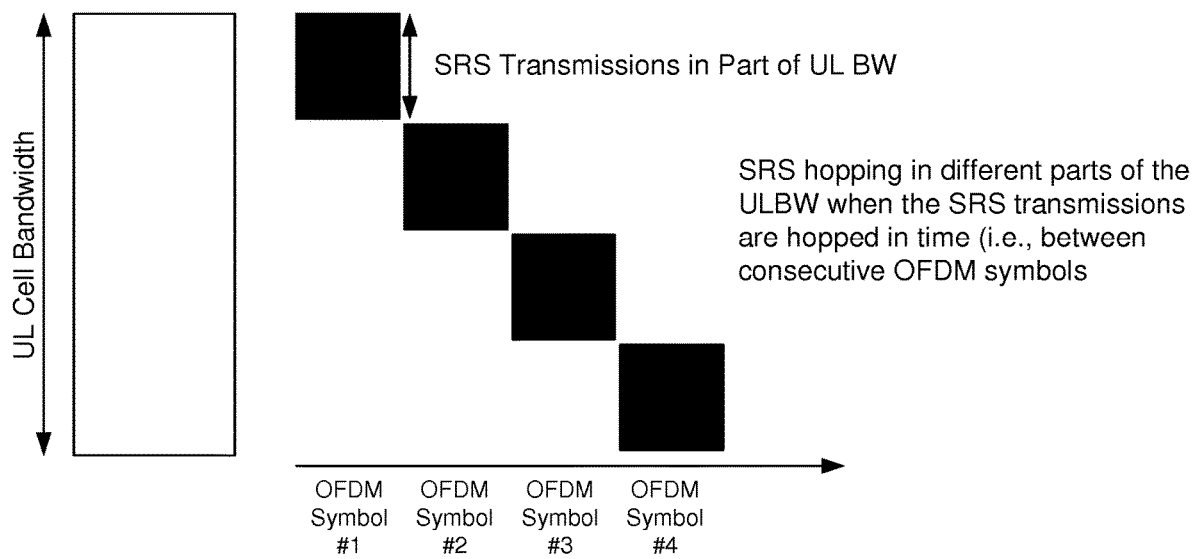
FIG. 6 shows another exemplary SRS hopping pattern.

FIG. 6 depicts one example of such SRS hopping solutions, e.g., over four consecutive SRS symbols. In FIG. 6, the UE hops between different parts of UL cell bandwidth to transmit the SRS signals in consecutive OFDM symbols to cover the whole spectrum.

The configuration of SRS symbols, such as SRS bandwidth, SRS frequency domain position, SRS hopping pattern and SRS subframe configuration are set semi-statically as a part of RRC information element.

There are two types of SRS transmission in LTE UL. They are periodic and aperiodic SRS transmission. Periodic SRS is transmitted at regular time instances as configured by means of RRC signaling. Aperiodic SRS is one shot transmission that is triggered by signaling in PDCCH.

There are in fact two different configurations related to SRS:
Cell specific SRS configuration
UE specific configuration The cell specific configuration in essence indicates what subframes may be used for SRS transmissions within the cell.

The UE specific configuration indicates to the terminal a pattern of subframes (among the subframes reserved for SRS transmission within the cell) and frequency domain resources to be used for SRS transmission of that specific UE. It also includes other parameters that the UE may use when transmitting the signal, such as frequency domain comb and cyclic shift.

This means that sounding reference signals from different UEs can be multiplexed in the time domain, by using UE-specific configurations such that the SRS of the two UEs are transmitted in different subframes. Furthermore, within the same symbol, sounding reference signals can be multiplexed in the frequency domain. The set of subcarriers is divided into two sets of subcarriers, or combs with the even and odd subcarriers respectively in each such set. Additionally, UEs may have different bandwidths to get additional FDM (Frequency Division Multiplexing). (The comb enables frequency domain multiplexing of signals with different bandwidths and also overlapping). Additionally, code division multiplexing can be used. Then different users can use exactly the same time and frequency domain resources by using different shifts of a basic base sequence.

As stated in TS 36.101, v14.1.0, Section 6.3.4: "The General ON/OFF time mask defines the observation period between Transmit OFF and ON power and between Transmit ON and OFF power. ON/OFF scenarios include; the beginning or end of DTX, measurement gap, contiguous, and non-contiguous transmission. The OFF power measurement period is defined in a duration of at least one sub-frame excluding any transient periods. The ON power is defined as the mean power over one sub-frame excluding any transient period. There are no additional requirements on UE transmit power beyond that which is required in subclause 6.2.2 and subclause 6.6.2.3."

Figure 7:
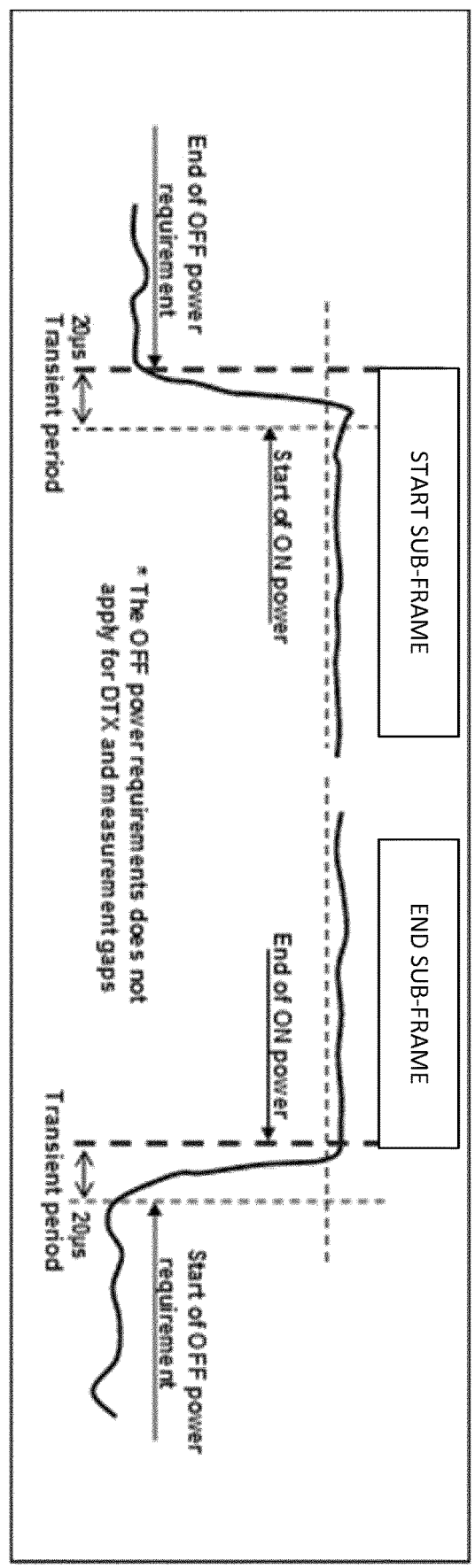
FIG. 7 shows an exemplary ON/OFF time mask for LTE.

As seen in FIG. 7, the ON/OFF time mask is design for 1 ms TTI in Rel-8 legacy LTE systems. The duration of ramping of power (UP or Down) in the mask is shorter compared to the length of sub-frame or slot but its position has an influence on system performance. The ramping UP or ramping DOWN duration is also called as transient time parameter. More specifically the transient time parameter defines at least a time period between any two points in time over which the UE can change its transmit power. For example, as shown in FIG. 7, during a transient time, the UE changes its transmit power from OFF power level to ON power level or from ON power level to OFF power level, and is exempted from meeting certain transmitter performance requirements during this period.

In terms of ramping or transient position there few non-limiting possibilities:
Ramping outside timeslot/sub-frame
Ramping inside time slot/sub-frame
Ramping partly inside and outside timeslot/sub-frame When SRS hopping is allowed between consecutive OFDM symbols, then the transient time will play a significant role since transient time may destroy significant part of SRS symbol, which may be detrimental with respect to UL demodulation performance of the SRS symbols.

In NR, the UE uses one OFDM symbol, two consecutive OFDM symbols, or four consecutive OFDM symbols for SRS transmissions. Depending on UE capabilities, there may be a need for retuning of the UE transmitter which may cause interruptions in transmissions. The retuning causes interruption in transmission of at least part of the SRS symbol(s). The retuning time can be 50-100 µs (or even more) depending on the UE architecture and capability. This constraint (i.e., retuning time) will significantly degrade the quality of the SRS transmission especially for larger subcarrier spacing of the SRS symbols. The base station that uses the SRS will not be able to decode or at least properly decode the SRS, thereby degrading overall system performance.

Figure 8:
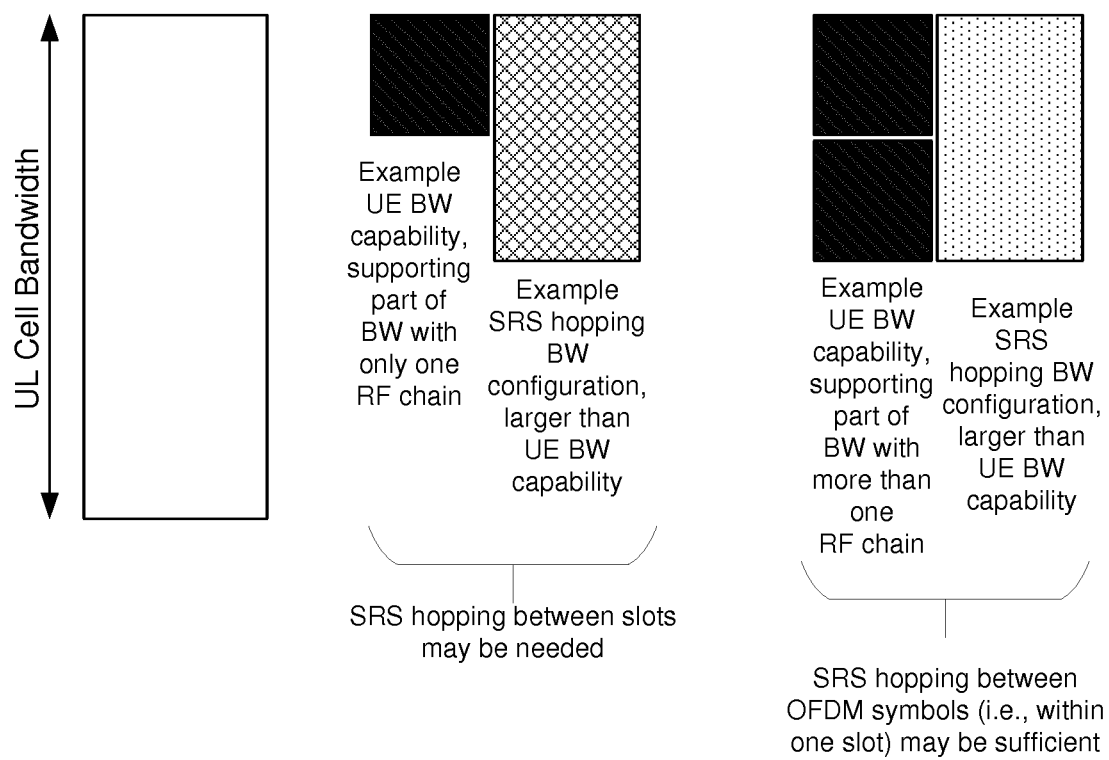
FIG. 8 shows exemplary relationships between SRS, configuration, and capability bandwidths.

The solution presented herein solves these problems by controlling the SRS configuration responsive to the UE configured bandwidth. FIG. 8 shows examples of relations between the UE BW capability ($BW_{cap}$), the UE configured BW ($BW_{UE,config}$), and the SRS hopping pattern BW ($BW_{hop}$). The solution presented herein provides solutions (e.g., suitable hopping patterns) which can alleviate or avoid any degradation of SRS due to the possible retuning of the UE transmitter. The main idea is that when a UE transmits multiple SRS within the same time resource (e.g., slot), then the UE is configured with a SRS hopping pattern (including SRS hopping bandwidth) based on at least the UE configured bandwidth or alternatively the UE bandwidth is configured (or adapted) based on the selected SRS hopping pattern (including SRS hopping bandwidth). The solution presented herein comprises of methods in both UE and a network node. As noted above, the solution presented herein seeks to alleviate or avoid any degradation of SRS due to the possible retuning of the UE transmitter, e.g., the possible retuning of an RF chain in the UE. This problem may be solved by using more than one RF chain in the UE. The RF chain may also be referred to as a frequency tuning range of the transmitter. In cases of a large tuning range when re-tuning time is considered, one RF chain may act the same as multiple RF chains when individual RF chains have a smaller tuning range as compared to one RF chain having higher tuning range.

FIGS. 9-11 broadly demonstrate the solution presented herein via an exemplary wireless network 10 (FIG. 9), an exemplary method 100 (FIG. 10), and an exemplary node device 200 (FIG. 11). As shown in FIG. 9, the wireless network 10 includes at least two nodes 12, 14 in communication with each other. For example, node 12 may comprise a network node, e.g., a base station, in communication with a UE node 14. It will be appreciated that network node 12 may alternatively or additionally communication with another network node 14. The solution presented herein may be implemented by either node 12, 14, either of which is generally referred to herein as node 200 (FIG. 11).

FIG. 10 shows a method 100, according to one exemplary embodiment, of controlling a Sounding Reference Signal (SRS) configuration for SRS transmissions via one or more resource blocks by a first node 14 in a wireless network. The SRS configuration comprises a hopping pattern and a first bandwidth associated with the SRS transmissions. The method 100 comprises determining the first bandwidth associated with the SRS transmissions (block 110), and determining a second bandwidth associated with a configuration of the first node 14 (block 120). As discussed further below, an exemplary first bandwidth comprises the SRS hopping bandwidth ($BW_{hop}$) and an exemplary second bandwidth comprises the configuration bandwidth of the first node 14, e.g., the UE configuration bandwidth ($BW_{UE,config}$) when the first node 14 comprises a UE. The method further comprises determining the SRS configuration for the first node 14 responsive to the first and second bandwidths (block 130), and configuring the first node 14 according to the determined SRS configuration to control SRS transmissions by the first node 14 (block 140).

FIG. 11 shows an exemplary node 200 comprising one or more processing circuits 210 for implementing the method 100 of FIG. 10. As discussed further herein, node 200 may comprise either node 12 or node 14 of FIG. 9. The one or more processing circuits 210 are configured to determine the first bandwidth associated with the SRS transmissions and determine a second bandwidth associated with a configuration of the first node 14. As discussed further below, an exemplary first bandwidth comprises the SRS hopping bandwidth ($BW_{hop}$) and an exemplary second bandwidth comprises the configuration bandwidth of the first node 14, e.g., the UE configuration bandwidth ($BW_{UE,config}$) when the first node 14 comprises a UE. The one or more processing circuits 210 are further configured to determine the SRS configuration for the first node 14 responsive to the first and second bandwidths, configure the first node 14 according to the determined SRS configuration to control SRS transmissions by the first node 14. Node 200 may further include a memory circuit 220 operatively connected to the processing circuit(s) 210 and configured to store instructions executed by the one or more processing circuits 210, as well as information used by the one or more processing circuits 210, e.g., the UE configuration bandwidth, SRS configuration information, etc. In addition, node 200 may include one or more communication circuits 230 operatively connected to the processing circuit(s) 210 and configured to transmit/receive signals, e.g., SRS signals, SRS configuration information, etc., to/from a remote node in the wireless network 10.

The solution presented herein includes multiple embodiments, some of which may be implemented by a network node 12, and others of which may be implemented by a UE node 14, either of which may be implemented as node 200. The different embodiments, as implemented by a node 200, are briefly summarized below.

In a first embodiment, where the SRS hopping is enabled within a single time resource (e.g. slot), the network node determines the UE configured bandwidth ($BW_{UE,config}$) and based on this, determines the suitable SRS hopping pattern with a suitable SRS hopping bandwidth ($BW_{hop}$) such that ($BW_{hop}$)≤($BW_{UE,config}$) and configures the UE with the determined SRS hopping pattern.

In a second embodiment, the network node determines the SRS hopping pattern such that ($BW_{hop}$)≤($BW_{UE,cap}$), and based on this, determines the UE configured bandwidth such that ($BW_{UE,config}$≥$BW_{hop}$); and configures the UE with the SRS hopping pattern and the UE configured bandwidth.

In a third embodiment, if the UE is configured by the network node with the SRS hopping pattern such that, ($BW_{hop}$)>($BW_{UE,config}$), then the UE adapts the SRS hopping pattern such that ($BW_{hop}$)'≤($BW_{UE,config}$), or the UE adapts the UE configured bandwidth such that ($BW_{hop}$)≤($BW_{UE,config}$)'. The UE may further inform the network regarding the adapted SRS hopping pattern including the adapted SRS hopping bandwidth parameter ($BW_{hop}$)' or information about the adapted UE configuration bandwidth ($BW_{UE,config}$)'. This will allow or enable the network node to receive and use the SRS transmitted by the UE according to the UE adapted SRS hopping pattern.

The rules which define relation between $BW_{hop}$, $BW_{UE,config}$ and $BW_{UE,cap}$ as described in different embodiments can be pre-defined in the specification and/or configured by a network node.

The solution presented herein has multiple advantages over existing systems that utilize SRS. First, the SRS transmission within the SRS hopping pattern does not cause any interruption on the actual SRS symbols. Further, the SRS reception quality is enhanced since the SRS can be hopped over frequency range within the UE supported bandwidth. The solution presented herein also provides flexibility to the network node to adapt the SRS hopping bandwidth in accordance with the UE bandwidth capability and/or UE configured bandwidth. Further, the UE throughput and also system throughput is enhanced in a scenario where SRS are used for uplink and/or downlink scheduling.

An example of a node could be a network node, which could be a more general term and can correspond to any type of radio network node or any network node, which communicates with a UE and/or with another network node. Examples of network nodes are NodeB, Base Station (BS), Multi-Standard Radio (MSR) radio node, e.g., MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in Distributed Antenna System (DAS), core network node (e.g., Mobile Switching Center (MSC), Mobile Management Entity (MME), etc.), O&M, Operation Support Systems (OSS), Self-Organizing Network (SON), positioning node (e.g., Evolved Serving Mobile Location Center (E-SMLC)), MDT, etc.

Another example of a node could be user equipment (UE), which is a non-limiting term user equipment (UE) and it refers to any type of wireless device communicating with a network node and/or with another UE in a cellular or mobile communication system. Examples of UE are target device, device-to-device (D2D) UE, machine type UE or UE capable of machine-to-machine (M2M) communication, PDA, iPAD, Tablet, mobile terminals, smart phone, laptop embedded equipped (LEE), laptop mounted equipment (LME), USB dongles etc.

In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

In the solution presented herein, any of the above mentioned nodes could become "the first node" and/or "the second node."

The term time resource used herein may correspond to any type of physical resource or radio resource expressed in terms of length of time. Examples of time resources are: symbol, time slot, subframe, radio frame, Transmission Time Interval (TTI), interleaving time, etc. The term TTI used herein may correspond to any time period (T0) over which a physical channel can be encoded and optionally interleaved for transmission. The physical channel is decoded by the receiver over the same time period (T0) over which it was encoded. The TTI may also interchangeably called as short TTI (sTTI), transmission time, slot, sub-slot, mini-slot, mini-subframe etc. As used herein, a resource block refers to the smallest unit of resources that can be allocated to a user, e.g., 180 kHz wide in frequency and 1 slot long in time.

The term bandwidth (BW) used herein is range of frequencies over which a node transmits to and/or receives signal from another node. The BW is interchangeably called as operating bandwidth, channel bandwidth, system bandwidth, configured bandwidth, transmission bandwidth, cell bandwidth, cell transmission BW, carrier bandwidth, etc. The BW can be expressed in any one of the following: G1 MHz, G2 GHz, in in terms of number of physical channels (e.g., G3 resource blocks, G4 subcarriers, etc.).

The UE configured bandwidth ($BW_{UE,config}$), is the bandwidth with which the UE can be configured to operate using one RF chain. This can be smaller than or equal to the carrier or cell bandwidth of the serving cell of the UE. The maximum configured bandwidth can be equal to the UE bandwidth capability ($BW_{cap}$). The configured bandwidth can be used for various purposes including or other than SRS transmissions. Examples of other purposes are scheduling of data, measurements (e.g., CSI, etc.), etc.

The term "BW part" (BWP) denotes part of the carrier bandwidth for which different decisions or actions are taken by the network node. In this case, the network node may indicate part of the uplink (UL) and/or downlink (DL) bandwidth for SRS transmissions. A BWP is typically smaller than the cell BW. In next generation radio (NR) the cell BW may be very large e.g., up to 400 MHz in Rel-15. Even larger cell BWs will be introduce in later releases. But the UE is typically served or scheduled over shorter BWs, e.g., over 20 MHz in a cell BW of 400 MHz. The BWP may be the same in UL and DL, or it may be different in UL and DL. Therefore DL BWP and UL BWP may also be independently configured. The purpose of the BWP is to enable the UE to save its battery power because the UE receiver and/or transmitter are required to be active only within the BWP. The BWP may also interchangeably be referred to as a UE configured BW, a UE active BW, a UE serving BW, a UE scheduling BW, an active BWP, etc. The BWP may be modified, configured, reconfigured, and/or deconfigured by any one of the following mechanisms: by the network node (e.g., serving cell of the UE) by sending a message or command to the UE, and/or by a timer in the UE that is pre-configured by the network node. Examples of commands include but are not limited to RRC messages, DL control information (DCI) command send on PDCCH, etc.

The SRS hopping bandwidth is the bandwidth over which the SRS configuration is defined. The SRS bandwidth is the bandwidth over which all SRS within the slot are transmitted (by using SRS hopping) from any single UE. This bandwidth can be smaller than UE RF bandwidth, or even it can be larger. This bandwidth represents the part of the carrier bandwidth for which SRS transmissions need to be done.

A component carrier (CC) also interchangeably called as carrier, Primary CC (PCC) or Secondary CC (SCC) is configured at the UE by the network node using higher layer signaling e.g. by sending RRC configuration message to the UE. The configured CC is used by the network node for serving the UE on the serving cell (e.g., on Primary Cell (PCell), Secondary Cell (SCell), Primary SCell (PSCell), etc.) of the configured CC. The configured CC is also used by the UE for performing one or more radio measurements (e.g. RSRP, RSRQ etc) on the cells operating on the CC e.g., PCell, SCell, or PSCell and neighboring cells.

The above definitions also include dual connectivity (DC) operation, which is actually performed based on corresponding CA configurations. In this invention disclosure, all methods that are described for CA operation are equally applicable to DC operation, unless stated otherwise.

One exemplary embodiment comprises a method, in a network node, of adapting the SRS configuration when the SRS configurations are done based on the UE configured bandwidth. This method corresponds to the "first embodiment" as mentioned herein. In the first embodiment, where the SRS hopping is enabled within a single time resource (e.g., slot), the network node determines the UE configured bandwidth ($BW_{UE,config}$) and based on this, determines the suitable SRS hopping pattern with a suitable SRS hopping bandwidth ($BW_{hop}$) such that ($BW_{hop}$)≤($BW_{UE,config}$) and configures the UE with the determined SRS hopping pattern. Depending on transient time between SRS transmissions, the SRS hopping at the UE may be enabled by the network node within one time resource e.g. one time slot. The following provides exemplary detailed steps related to the first embodiment.

In the first embodiment, network node determines the UE configured bandwidth. The UE configured bandwidth is used by the UE for performing one or more operations. The UE configured BW for UL and DL can be the same or they can be different. In this embodiment the UL BW is of particular relevance. Examples of such operations for which the UE is configured with certain BW are transmission of data channel and/or control channels (e.g., Physical Uplink Shared CHannel (PUSCH), Physical Uplink Control CHannel (PUCCH), etc.). For example, the UE can be configured to transmit signals such as PUCCH by the network node.

The UE configured bandwidth is less than or equal to the UE maximum BW, aka UE bandwidth capability. The UE configured bandwidth is also less than or equal to the BW of the cell in which the UE operates. The network node configures the UE with BW which is required by certain operation to save UE battery and also to reduce UL interference.

The information about the UE configured bandwidth is obtained by the network node based on one or more of the following means:
  By retrieving information stored in the network node;
  By receiving information from the UE and/or from another network node which is aware of the UE configured BW;
  Based on the results of certain operations, e.g., BW over which the UE is scheduled, etc.;
  Historical data or statistics.

The above information may be known to the network while at the startup of the link, or via RRC message, or via other network nodes.

The network node also determines the SRS hopping bandwidth and pattern based on UE configured bandwidth. Depending on the determined UE configured bandwidth ($BW_{UE,config}$), the network node further determines the SRS configuration which includes the SRS hopping pattern and SRS hopping bandwidth.

We define the SRS hopping bandwidth as $BW_{hop}$. We can formulate the hopping pattern $P_{hop}$ as a function of $BW_{UE}$ and $BW_{hop}$. Thus, $P_{hop}$ may be represented by:

$$P_{hop}=f(BW_{UE,config}, BW_{hop}) \quad (1)$$

Figure 12:
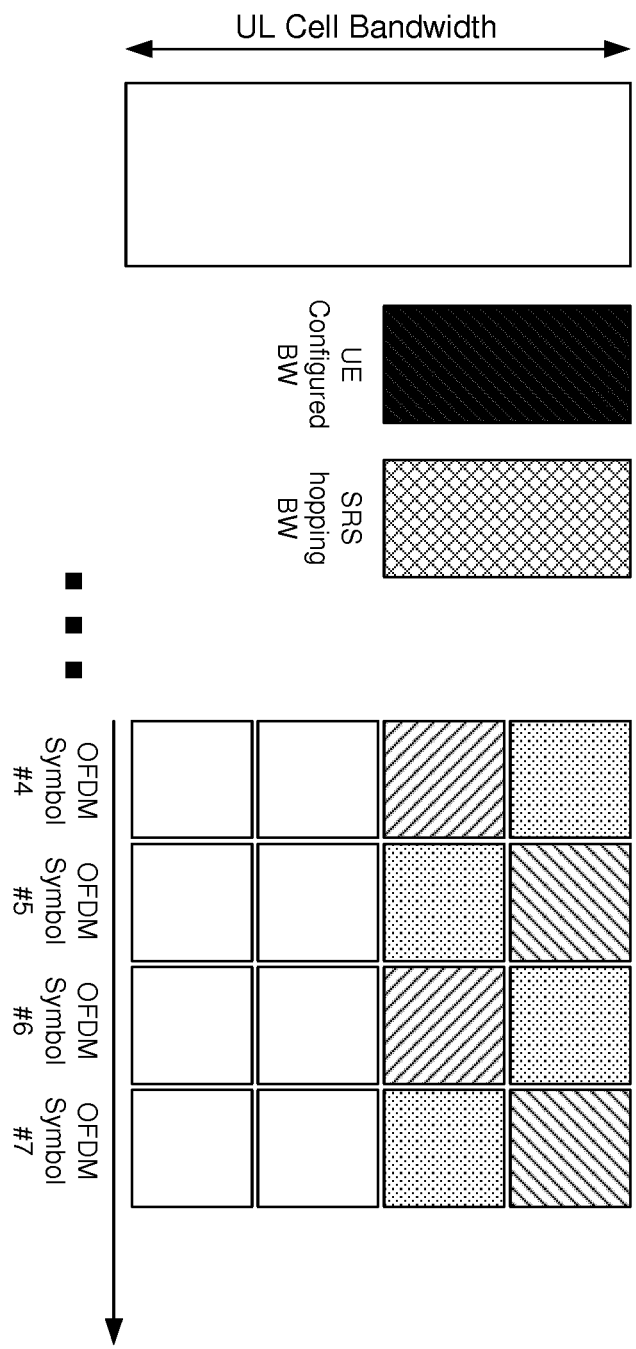
FIG. 12 shows an exemplary hopping pattern within a time slot.
Figure 13:
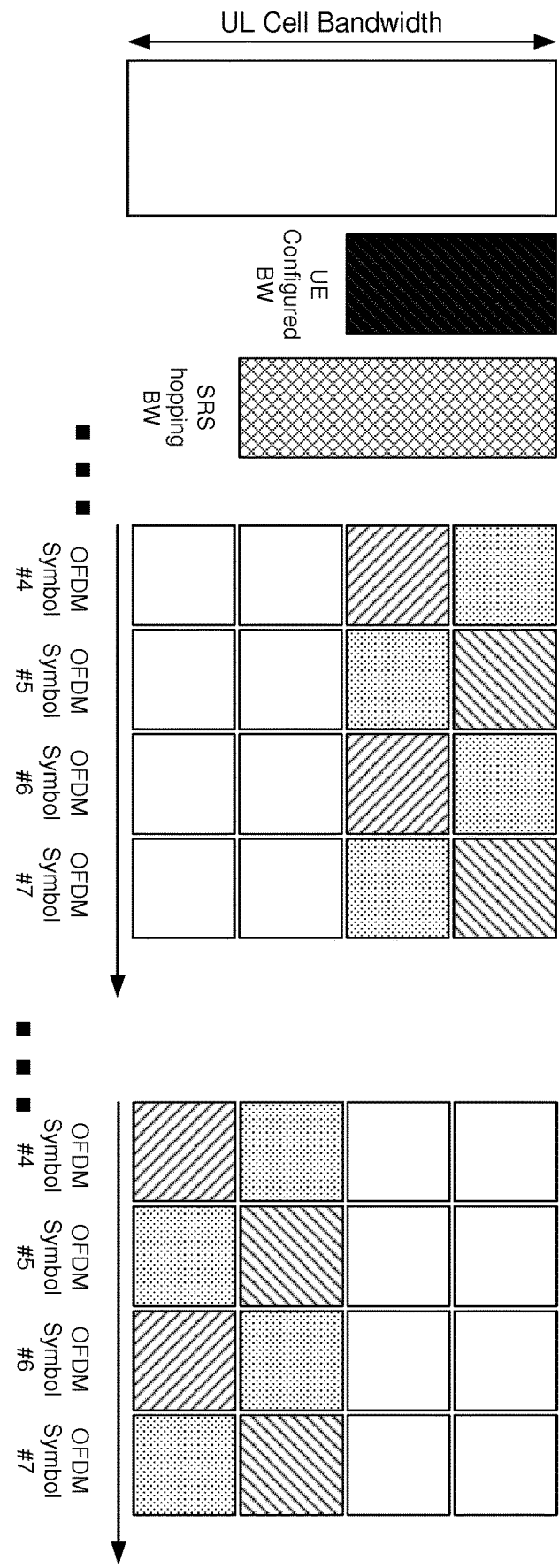
FIG. 13 shows an exemplary hopping pattern spanning multiple time slots.

Some nonlimiting examples include:
  If $BW_{UE,config} \geq BW_{hop}$, then hopping pattern will include hopping instances within the transmission slot, i.e. in between the OFDM symbols, as shown in FIG. 12.
  If $BW_{UE,config} < BW_{hop}$, then hopping pattern will include hopping instances between the transmission slots, i.e. if one SRS transmission is done in one or more of the OFDM symsoils in slot #1, then the next SRS transmission will be done in the next slot, which is slot #2, as shown in FIG. 13.

The network node also configures the UE or other network node. In this step, the network node configures the UE (or another network node) to transmit the SRS signals with the determined SRS configurations (i.e., SRS hopping pattern, $P_{hop}$ and SRS hopping bandwidth, $B_{hop}$). The network node may further receive the SRS signals transmitted by the UE and use them for one or more operations e.g., scheduling, channel estimation etc.

Another exemplary embodiment comprises a method in a network node of adapting the SRS configuration when SRS configuration is done based on SRS hoping requirements. This exemplary embodiment corresponds to the "second embodiment" as mentioned herein. In the second embodiment, the network node determines the SRS hopping pattern such that $(BW_{hop}) \leq (BW_{UE,cap})$, and based on this, determines the UE configured bandwidth such that $(BW_{UE,config} \geq BW_{hop})$; and configures the UE with the SRS hopping pattern and the UE configured bandwidth.

In the second embodiment, the network node determines the SRS hopping pattern configuration for the UE. In this step, the network node first determines the SRS hopping pattern for the UE. The SRS hopping pattern comprises of also SRS hopping bandwidth. This decision may be based on any of the following reasons:

- The need for channel information in certain parts of the band at the network node. For example if the channel is frequency selective then the network node selects a pattern which contains maximum number of SRS symbols within the SRS pattern.
- The need for scheduling the UE is certain parts of the bands from network node point of view.
- The need for information related to certain beam of the network node towards the UE.
- The network node may need to perform load balancing by distributing the resources among different UEs.
- The network node may need to distribute the resources for the UEs for interference management purposes.
- To adapt SRS hopping BW as function of the UE bandwidth capability. The SRS hopping bandwidth $BW_{hop}$ should be equal to or smaller than the UE bandwidth capability ($BW_{UE,cap}$). For example, if the UE supports one or multiple RF chains each supporting certain parts of the UL cell bandwidth, then the $BW_{hop}$ is chosen in a way so that, the UE bandwidth capability is not exceeded. The UE BW capability information can be determined by the network node by receiving it from UE, based on pre-defined information, statistics or history, information received from another network node etc.

The network node also determines the UE configured bandwidth. In this step, the network node based on the determined SRS hopping pattern (including SRS hopping BW, $BW_{hop}$) determines the UE configured bandwidth for SRS transmission such that the UE configured bandwidth is larger than or equal to the hopping bandwidth. This means BW over which the SRS within the same time resource (e.g. slot) is allowed to hop within the SRS hopping pattern. In this case, RF tuning is required if the UE only supports one RF chain or supports more than one RF chain while not being able to support full cell bandwidth. Since in the previous step the determined $BW_{hop}$ is not larger then $BW_{UE,cap}$, therefore the $BW_{UE,config}$ also does not exceed $BW_{UE,cap}$.

The UE SRS bandwidth configuration may be determined according to:

$$BW_{UE,config} = f(BW_{hop}) \quad (2)$$

In one example $BW_{UE,config} = BW_{hop}$. In another example $BW_{UE,config} > BW_{hop}$ while $BW_{UE,config} \leq BW_{UE,cap}$. This case can be applied when the other operations such as UE needs to be scheduled over a larger BW i.e. larger than $BW_{hop}$.

The network node also configures the UE (or other network node). In this step, the network node configures the UE (or another network node) to transmit the SRS signals with the determined SRS configurations (i.e., SRS hopping pattern, $P_{hop}$ and SRS hopping bandwidth, $B_{hop}$). If the UE is already configured with certain BW then the network node may have to reconfigure the UE with BW.

Another exemplary embodiment comprises a method in a UE of adapting SRS hopping pattern. This method corresponds to the "third embodiment" mentioned herein. In this third embodiment, if the UE is configured by the network node with the SRS hopping pattern such that, $(BW_{hop}) > (BW_{UE,config})$, then the UE adapts the SRS hopping pattern such that $(BW_{hop})' \leq (BW_{UE,config})$, or the UE adapts the UE configured bandwidth such that $(BW_{hop}) \leq (BW_{UE,config})'$. The UE may further inform the network regarding the adapted SRS hopping pattern including the adapted SRS hopping bandwidth parameter $(BW_{hop})'$ or information about the adapted UE configuration bandwidth $(BW_{UE,config})'$.

Figure 14:
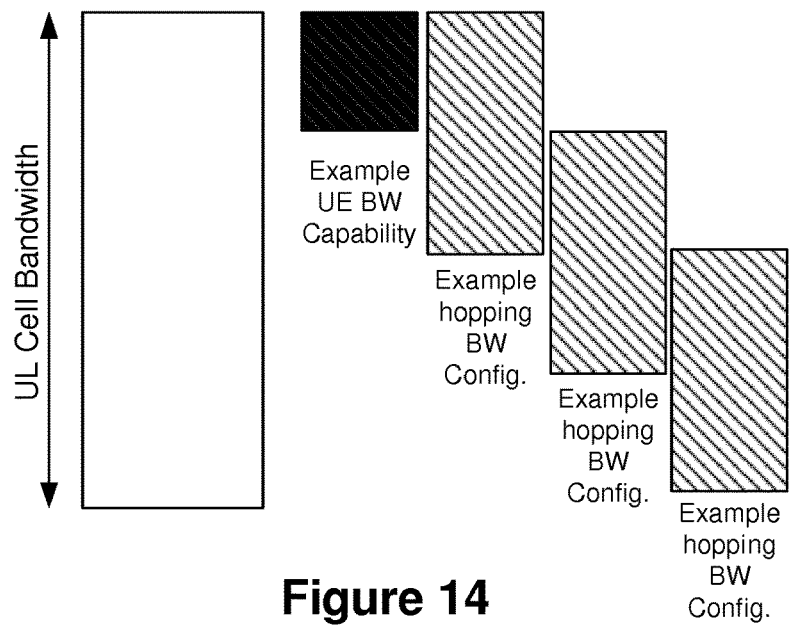
FIG. 14 shows an example of autonomous adaptation of the hopping pattern.

In the third embodiment, the UE receives the SRS hopping bandwidth configuration from a network node. In this step, a network node (or another node such as another UE) configures a UE to transmit SRS certain parts of the bandwidth, as shown in FIG. 14. In this case, the transmitted SRS configuration is such that, $(BW_{hop}) > (BW_{UE,config})$. In another example, the transmitted SRS configuration is such that, $(BW_{hop}) > (BW_{UE,cap})$.

The UE also adapts its SRS hopping bandwidth based on its own bandwidth capability, as shown in FIG. 14. Because the network node configured SRS hopping bandwidth is not possible by the UE due to its bandwidth capabilities, the UE adjusts the SRS hopping bandwidth, thus adopting an adapted SRS hopping bandwidth configuration, denoted as $(BW_{hop})'$.

The adapted SRS hopping BW $(BW_{hop})'$ is such that it (i.e., $BW_{hop})'$, does not exceed the UE BW capability. Similarly, the UE may adapt the UE configured bandwidth such that $(BW_{hop}) \leq (BW_{UE,config})'$. The UE then autonomously reconfigure its BW to be able to transmit the SRS signals according to the adapted SRS hopping pattern (including the adapted SRS bandwidth). The UE then transmits SRS signals using the adapted SRS hopping pattern. The adapted hopping pattern may also have a different time domain allocation in addition to the different frequency domain allocation (i.e., adapted SRS bandwidth). For example, the adapted time domain pattern could have a different periodicity and/or slot offset.

The UE may optionally inform the network node (or other node) on its adjustment. For example, the UE may optionally transmit information regarding the adapted SRS hopping pattern including the adapted SRS hopping bandwidth parameter $(BW_{hop})'$ to the network node. The network node uses the received information for performing one or more tasks or operations e.g. adjusts or adapts its receiver, receives SRS signals over the UE adapted SRS BW, schedule UE using the received SRS quality, channel estimation, etc.

The method in the third embodiment is further applicable to a scenario where the UE is configured with two or more BWPs within the same cell BW. The configured BWPs may be contiguous or non-contiguous in the frequency domain within the cell BW. The UE configured BW ($BW_{UE,config}$) in this case comprises the total BW spanning all the configured BWPs of the UE. In this example, assume that the SRS hopping BW ($BW_{hop}$) of the configured SRS hopping pattern is also equal to the total BW spanning all the configured BWPs of the UE, i.e., the $BW_{UE,config}$. Further, assume that at least one of the BWPs is subsequently deconfigured (e.g., via a DCI command sent by the network node to the UE). As a result, when the deconfigured BWP is near an edge of the $BW_{UE,config}$, the $BW_{UE,config}$ adapts to this deconfiguration by becoming smaller. As a result, the UE configured BW ($BW_{UE,config}$) will become smaller than the SRS hopping BW ($BW_{hop}$) because the latter has not been modified by the network node. To address this, the UE compares the updated UE configured BW ($BW_{UE,config}$) to the SRS hopping BW ($BW_{hop}$), and adapts the SRS hopping BW using the method of the third embodiment. This is further explained with a specific example. Assume that the UE is configured with two contiguous BWPs (BWP1 and BWP2), where each of BWP1 and BWP2 is 10 MHz, and assume that the SRS hopping BW is 20 MHz and spans both BWPs. Therefore, $BW_{hop}$=20 MHz and also the current $BW_{UE,config}$=10 MHz+ 10 MHz=20 MHz. The UE hops the SRS in frequency domain over 20 MHz covering both BWP1 and BWP2 according to the configured SRS hopping pattern. Assume the network node then deconfigures BWP1. As a result, while $BW_{hop}$ remains at 20 MHz, the updated UE configuration BW ($BW_{UE,config}$)' becomes 10 MHz, resulting in $BW_{hop}$>($BW_{UE,config}$)'. Per the third embodiment, the UE reduces $BW_{hop}$ to 10 MHz to satisfy the condition of the third embodiment, namely ($BW_{hop}$)≤($BW_{UE,config}$)'. The UE may further inform the network node that it adapted the $BW_{hop}$ from 20 MHz to ($BW_{hop}$)'=10 MHz due to the change in $BW_{UE,config}$ from 20 MHz to 10 MHz caused by the deconfiguration of at least one BWP. The UE checks the relation between $BW_{hop}$ and $BW_{UE,config}$ every time the configuration of any BWP changes and/or every time the configuration of SRS hopping changes. It will be appreciated that this example of the third embodiment may also apply if the configuration or reconfiguration of one or more BWPs causes the $BW_{UE,config}$ to become larger. As such, whenever one or more BWPs are configured, reconfigured, or deconfigured, the UE adapts the $BW_{UE,config}$ to span the remaining BWPs, and then checks the relation between $BW_{hop}$ and the adapted $BW_{UE,config}$, and then adapts $BW_{hop}$ if necessary to make sure the SRS hopping bandwidth is less than or equal to the UE configuration bandwidth.

Figure 15:
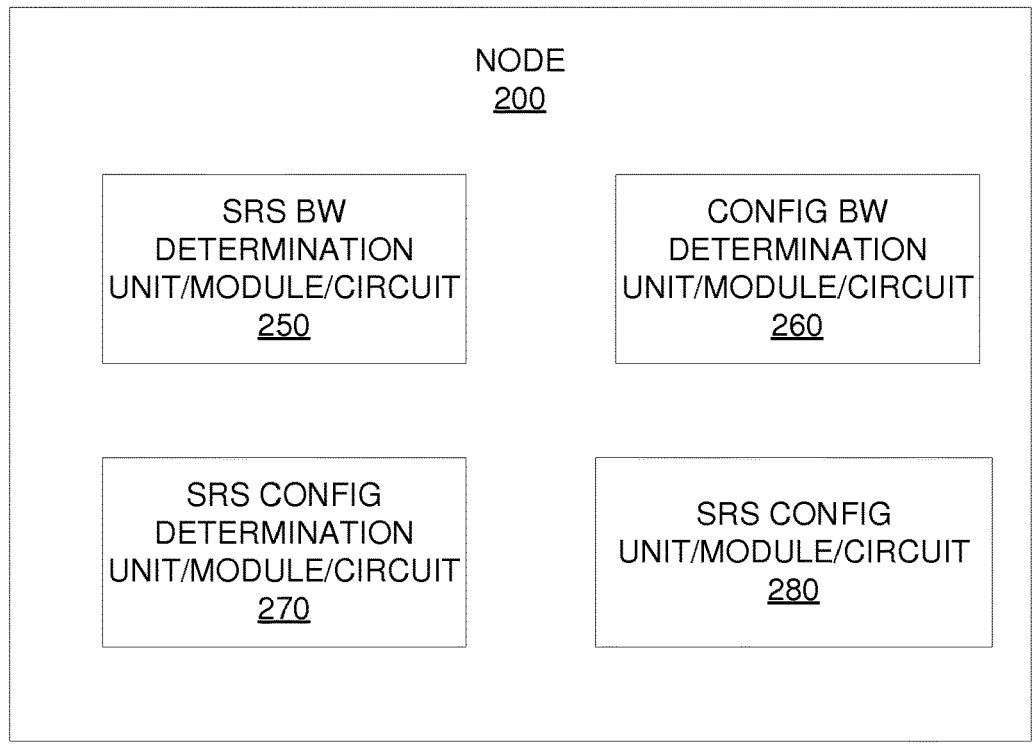
FIG. 15 shows a node according to another exemplary embodiment.

While FIG. 11 shows node 200 as comprising one or more processing circuits 210, it will be appreciated that one or more of these processing circuits 210 may alternatively comprise functional means, units, or modules for implementing method 100 of FIG. 10. For example, as shown in FIG. 15, node 200 may comprise functional means, units, circuits, and/or modules that include an SRS BW determination unit/module/circuit 250, a configuration BW determination unit/module/circuit 260, an SRS configuration determination unit/module/circuit 270, and a configuration unit/module/circuit 280 that respectively implement 110-140 of method 100 in FIG. 10.

Those skilled in the art will also appreciate that embodiments herein further include corresponding computer programs. A computer program comprises instructions which, when executed on at least one processing circuit 210 of node 200, cause the node 200 to carry out any of the respective processing described above with respect to FIG. 10. A computer program in this regard may comprise one or more code modules corresponding to the means or units described above. To that end, memory 220 stores the code to be executed by the processing circuitry 210 and/or communication circuitry 230 according to the method 100 of FIG. 10.

The solution presented herein may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of controlling a Sounding Reference Signal (SRS) configuration for SRS transmissions via one or more resource blocks by a first node in a wireless network, the method implemented by the first node and comprising:
   determining a first bandwidth associated with the SRS transmissions;
   determining a second bandwidth associated with a configuration of the first node;
   determining the SRS configuration for the first node responsive to the first and second bandwidths, wherein the SRS configuration comprises a hopping pattern and the first bandwidth; and
   configuring the first node according to the determined SRS configuration to control SRS transmissions by the first node;
   wherein determining the SRS configuration comprises, responsive to the first bandwidth exceeding the second bandwidth, adapting the first bandwidth and/or the hopping pattern such that the adapted first bandwidth is less than or equal to the second bandwidth.

2. The method of claim 1 wherein determining the first bandwidth comprises receiving the first bandwidth from a second node within the wireless network and remote from the first node.

3. The method of claim 1 further comprising transmitting the adapted first bandwidth and/or hopping pattern to a second node.

4. The method of claim 1 wherein:
   the second bandwidth spans a first plurality of bandwidth parts; and
   the method further comprises adapting the second bandwidth to span a second plurality of bandwidth parts responsive to a configuration or reconfiguration of at least one additional bandwidth part added to the first plurality of bandwidth parts and/or a deconfiguration of at least one bandwidth part in the first plurality of bandwidth parts to form the second plurality of bandwidth parts.

5. The method of claim 4 wherein the first plurality of bandwidth parts and/or the second plurality of bandwidth parts comprise contiguous bandwidth parts.

6. The method of claim 4 wherein the first plurality of bandwidth parts and/or the second plurality of bandwidth parts comprise non-contiguous bandwidth parts.

7. The method of claim 1 wherein one of the one or more resource blocks comprises one time slot.

8. A first node in a wireless network configured to control a Sounding Reference Signal (SRS) configuration for SRS transmissions via one or more resource blocks by the first node in the wireless network, the first node comprising one or more processing circuits configured to:
   determine a first bandwidth associated with the SRS transmissions;
   determine a second bandwidth associated with a configuration of the first node;
   determine the SRS configuration for the first node responsive to the first and second bandwidths, wherein the SRS configuration comprises a hopping pattern and the first bandwidth; and configure the first node according to the determined SRS configuration to control SRS transmissions by the first node;

wherein to determine the SRS configuration, the one or more processing circuits are configured to, responsive to the first bandwidth exceeding the second bandwidth, adapt the first bandwidth and/or the hopping pattern such that the adapted first bandwidth is less than or equal to the second bandwidth.

9. The first node of claim 8 wherein the one or more processing circuits are configured to determine the first bandwidth by receiving the first bandwidth from a second node within the wireless network and remote from the first node.

10. The first node of claim 8, further comprising communication circuits configured to transmit the adapted first bandwidth and/or hopping pattern to a second node.

11. The first node of claim 8 wherein:
the second bandwidth spans a first plurality of bandwidth parts;
the one or more processing circuits are further configured to adapt the second bandwidth to span a second plurality of bandwidth parts responsive to a configuration or reconfiguration of at least one additional bandwidth part added to the first plurality of bandwidth parts and/or a deconfiguration of at least one bandwidth part in the first plurality of bandwidth parts to form the second plurality of bandwidth parts.

12. The first node of claim 8 wherein one of the one or more resource blocks comprises one time slot.

13. A first node in a wireless network configured to control a Sounding Reference Signal (SRS) configuration for SRS transmissions via one or more resource blocks by the first node in the wireless network, the first node comprising:
an SRS bandwidth determination circuit configured to determine a first bandwidth associated with the SRS transmissions;
a configuration bandwidth determination circuit configured to determine a second bandwidth associated with a configuration of the first node;
an SRS configuration determination circuit configured to determine the SRS configuration for the first node responsive to the first and second bandwidths, wherein the SRS configuration comprises a hopping pattern and the first bandwidth; and
an SRS configuration circuit configured to configure the first node according to the determined SRS configuration to control SRS transmissions by the first node;
wherein to determine the SRS configuration, the SRS configuration determination circuit is configured to, responsive to the first bandwidth exceeding the second bandwidth, adapt the first bandwidth and/or the hopping pattern such that the adapted first bandwidth is less than or equal to the second bandwidth.

14. The first node of claim 13 wherein the SRS bandwidth determination circuit is configured to determine the first bandwidth by receiving the first bandwidth from a second node within the wireless network and remote from the first node.

15. The first node of claim 13 wherein the SRS configuration circuit is further configured to transmit the adapted first bandwidth and/or hopping pattern to a second node.

16. The first node of claim 13:
wherein the second bandwidth spans a first plurality of bandwidth parts;
the configuration bandwidth determination circuit is further configured to adapt the second bandwidth to span a second plurality of bandwidth parts, responsive to a configuration or a reconfiguration of at least one additional bandwidth part added to the first plurality of bandwidth parts and/or a deconfiguration of at least one bandwidth part in the first plurality of bandwidth parts to form the second plurality of bandwidth parts, adapt the second bandwidth to span the second plurality of bandwidth parts.

17. The first node of claim 16 wherein the first plurality of bandwidth parts and/or the second plurality of bandwidth parts comprise contiguous bandwidth parts.

18. The first node of claim 16 wherein the first plurality of bandwidth parts and/or the second plurality of bandwidth parts comprise non-contiguous bandwidth parts.

19. The first node of claim 13 wherein one of the one or more resource blocks comprises one time slot.

20. A non-transitory computer readable medium storing a computer program product for controlling a Sounding Reference Signal (SRS) configuration for SRS transmissions via one or more resource blocks by a first node in a wireless network, the computer program product comprising software instructions which, when run on at least one processing circuit in the first node in the wireless network, cause the first node to:
determine a first bandwidth associated with the SRS transmissions;
determine a second bandwidth associated with a configuration of the first node;
determine the SRS configuration for the first node responsive to the first and second bandwidths, wherein the SRS configuration comprises a hopping pattern and the first bandwidth; and
configure the first node according to the determined SRS configuration to control SRS transmissions by the first node;
wherein to determine the SRS configuration, the first node is caused to, responsive to the first bandwidth exceeding the second bandwidth, adapt the first bandwidth and/or the hopping pattern such that the adapted first bandwidth is less than or equal to the second bandwidth.

* * * * *